(12) United States Patent
Yu et al.

(10) Patent No.: US 10,618,259 B2
(45) Date of Patent: Apr. 14, 2020

(54) COATED SUBSTRATE AND ARTICLES MADE THEREFROM

(71) Applicant: Dow Global Technologies LLC, Midland, MI (US)

(72) Inventors: Haiyang Yu, Shanghai (CN); Yong Chen, Shanghai (CN); Yongchun Chen, Hubei (CN); Hang Wu, Fujian (CN)

(73) Assignee: Dow Global Technologies LLC, Midland, MI (US)

( * ) Notice: Subject to any disclaimer, the term of this patent is extended or adjusted under 35 U.S.C. 154(b) by 219 days.

(21) Appl. No.: 15/317,419

(22) PCT Filed: Jun. 11, 2015

(86) PCT No.: PCT/CN2015/018246
§ 371 (c)(1),
(2) Date: Dec. 9, 2016

(87) PCT Pub. No.: WO2015/188763
PCT Pub. Date: Dec. 17, 2015

(65) Prior Publication Data
US 2017/0106635 A1 Apr. 20, 2017

(30) Foreign Application Priority Data
Jun. 12, 2014 (WO) ................ PCT/CN2014/079770

(51) Int. Cl.
*B32B 27/32* (2006.01)
*B32B 7/12* (2006.01)
(Continued)

(52) U.S. Cl.
CPC .............. *B32B 27/32* (2013.01); *B32B 5/022* (2013.01); *B32B 5/024* (2013.01); *B32B 7/12* (2013.01);
(Continued)

(58) Field of Classification Search
CPC .......... B32B 27/32; B32B 5/022; B32B 5/024; B32B 7/12; B32B 27/12; B32B 27/302;
(Continued)

(56) References Cited

U.S. PATENT DOCUMENTS 4,198,327 A 4/1980 Matsumoto et al.
4,789,699 A 12/1988 Kieffer et al.
(Continued)

FOREIGN PATENT DOCUMENTS

EP 0873242 B1 2/2002
EP 0712892 B1 3/2002
(Continued)

OTHER PUBLICATIONS

Williams et al., Polymer Letters, vol. 6, 621-624, 1968.

*Primary Examiner* — Vincent Tatesure
(74) *Attorney, Agent, or Firm* — Quarles & Brady LLP (57) ABSTRACT

A coated substrate which includes a) a fabric substrate layer; b) an adhesive layer which is formed from a first composition comprising a thermoplastic elastomer and an anhydride and/or carboxylic acid functionalized, chlorinated olefin-based polymer that has a chlorine content from 1 to 20 wt %, based on the total weight of the anhydride and/or carboxylic acid functionalized, chlorinated olefin-based polymer and the thermoplastic elastomer; and c) a non-polar olefin-based layer formed from a second composition comprising at least one non-polar olefin-based polymer is provided. Also provided are an adhesive composition and articles comprising the coated substrate.

A coated substrate comprising the following: a) a fabric substrate layer; b) an adhesive layer which is formed from a first composition comprising a thermoplastic elastomer and an anhydride and/or carboxylic acid functionalized, chlorinated olefin-based polymer that has a chlorine content from 10 to 35 wt %, based on the total weight of the (Continued)

anhydride and/or carboxylic acid functionalized, chlorinated olefin-based polymer; and c) a non-polar olefin-based layer formed from a second composition comprising at least one non-polar olefin-based polymer.

20 Claims, 2 Drawing Sheets

(51) Int. Cl.
    *B32B 27/12*     (2006.01)
    *C09J 151/06*     (2006.01)
    *B32B 5/02*     (2006.01)
    *B32B 27/30*     (2006.01)
    *C08L 51/06*     (2006.01)
    *C08L 53/02*     (2006.01)
    *C09J 153/02*     (2006.01)
    *C08L 23/26*     (2006.01)

(52) U.S. Cl.
CPC ............ *B32B 27/12* (2013.01); *B32B 27/302* (2013.01); *C08L 23/26* (2013.01); *C08L 51/06* (2013.01); *C08L 53/025* (2013.01); *C09J 151/06* (2013.01); *C09J 153/02* (2013.01); *C09J 153/025* (2013.01); *B32B 2255/10* (2013.01); *B32B 2255/26* (2013.01); *B32B 2262/0253* (2013.01); *B32B 2262/0276* (2013.01); *B32B 2270/00* (2013.01); *B32B 2274/00* (2013.01); *B32B 2307/712* (2013.01)

(58) Field of Classification Search
CPC ....... C08L 23/26; C08L 53/025; C09J 151/06; C09J 153/02; C09J 153/025
USPC .......................................................... 442/149
See application file for complete search history.

(56) References Cited

U.S. PATENT DOCUMENTS

| | | | |
|---|---|---|---|
| 5,061,572 A | 10/1991 | Hamada et al. | |
| 5,093,422 A | 3/1992 | Himes | |
| 5,332,613 A | 7/1994 | Taylor et al. | |
| 5,504,172 A | 4/1996 | Imuta et al. | |
| 6,525,157 B2 | 2/2003 | Cozewith et al. | |
| 6,582,829 B1 | 6/2003 | Quinn et al. | |
| 6,960,635 B2 | 11/2005 | Stevens et al. | |
| 7,045,574 B1 * | 5/2006 | Funakoshi | C08F 8/00 525/64 |
| 7,763,692 B2 | 7/2010 | Tamai et al. | |
| 8,450,430 B2 | 5/2013 | Silvis et al. | |
| 2004/0087235 A1 | 5/2004 | Morman et al. | |
| 2004/0122408 A1 | 6/2004 | Potnis et al. | |
| 2004/0122409 A1 | 6/2004 | Thomas et al. | |
| 2005/0106965 A1 * | 5/2005 | Wevers | B32B 27/12 442/85 |
| 2017/0106635 A1 | 4/2017 | Yu et al. | |

FOREIGN PATENT DOCUMENTS

| | | |
|---|---|---|
| EP | 1022125 B1 | 11/2004 |
| JP | 2004209702 A | 7/2004 |
| JP | 2006089626 A | 4/2006 |
| WO | 00/01745 A1 | 1/2000 |
| WO | 2004/041538 A1 | 5/2004 |
| WO | 2016/176821 A1 | 11/2016 |

* cited by examiner

COATED SUBSTRATE AND ARTICLES MADE THEREFROM

RELATED APPLICATIONS

This application is a 371 of International Application No. PCT/CN2015/081246, filed on Jun. 11, 2015 which claims priority to PCT/CN2014/079770, filed Jun. 12, 2014, the disclosures of which are incorporated herein by reference.

FIELD OF INVENTION

The instant invention relates to a coated substrate and articles made therefrom.

BACKGROUND OF THE INVENTION

Coated fabric is widely used in products, such as backpacks, tents, and outwear. Such fabrics may be formed by laminating polyethylene terephthalate (PET) or nylon fabrics with thermoplastic sheet using suitable adhesives. The thermoplastic sheets most widely used for such applications include those made from polyvinyl chloride (PVC) or styrene block copolymers. However, PVC is not considered environmental benign while styrene block copolymers have poor weatherability. More environmentally benign and stable polymeric alternatives include polyolefins sheets. However, polyolefin elastomers are more difficult to laminate to fabric substrates. There is therefore for a system combining weatherability, environmental friendliness, ease of application and use and adhesion to the substrate.

SUMMARY OF THE INVENTION

The instant invention is a coated substrate and articles made therefrom.

In one embodiment, the instant invention provides a coated substrate comprising a) a fabric substrate layer; b) an adhesive layer which is formed from a first composition comprising a thermoplastic elastomer and an anhydride and/or carboxylic acid functionalized, chlorinated olefin-based polymer that has a chlorine content from 1 to 20 wt %, based on the total weight of the anhydride and/or carboxylic acid functionalized, chlorinated olefin-based polymer; and c) a non-polar olefin-based layer formed from a second composition comprising at least one non-polar olefin-based polymer.

In one embodiment, the invention provides a coated substrate comprising:

a) a fabric substrate layer;

b) an adhesive layer which is formed from a first composition comprising a thermoplastic elastomer and an anhydride and/or carboxylic acid functionalized, chlorinated olefin-based polymer that has a chlorine content from 10 to 35 wt %, based on the total weight of the anhydride and/or carboxylic acid functionalized, chlorinated olefin-based polymer; and c) a non-polar olefin-based layer formed from a second composition comprising at least one non-polar olefin-based polymer

DETAILED DESCRIPTION OF THE INVENTION

The instant invention is a coated substrate and articles made therefrom.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "olefin-based polymer," as used herein, refers to a polymer that comprises a majority amount of polymerized olefin monomer, for example ethylene or propylene (based on weight of the polymer) and, optionally, may contain at least one comonomer.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Layer" and like terms mean a single thickness or coating of a compound, polymer or composition spread out or covering a surface.

"Nonwoven fabric" and like terms mean a fabric or like material that is made from fibers, bonded together by chemical, mechanical, heat or solvent treatment. The term is used to denote fabrics, like felt, than are neither woven nor knitted.

"Spunbond fabric" and like terms mean a fabric or like material that is made by depositing extruded, spun filaments onto a collecting belt in a uniform, random manner followed by bonding of the fibers.

Non-polar olefin-based layer" means a layer formed from at least one non-polar olefin-based polymer. A non-polar olefin-based polymer comprises a majority wt % of monomer units derived from an olefin (e.g., ethylene or propylene), and no polar component. As used herein, the term "polar component" refers to a chemical group comprising at least one heteroatom (e.g., oxygen, sulfur, nitrogen).

In a first embodiment, the instant invention provides a coated substrate comprising a) a fabric substrate layer; b) an adhesive layer which is formed from a first composition comprising a thermoplastic elastomer and an anhydride and/or carboxylic acid functionalized, chlorinated olefin-based polymer that has a chlorine content from 10 to 35 wt %, based on the total weight of the anhydride and/or carboxylic acid functionalized, chlorinated olefin-based polymer; and c) a non-polar olefin-based layer formed from a second composition comprising at least one non-polar olefin-based polymer.

In a second embodiment, the instant invention provides a coated substrate comprising a) a fabric substrate layer; b) an adhesive layer which is formed from a first composition comprising a thermoplastic elastomer and an anhydride and/or carboxylic acid functionalized, chlorinated olefin-based polymer that has a chlorine content from 1 to 20 wt %, based on the total weight of the anhydride and/or carboxylic acid functionalized, chlorinated olefin-based polymer and the thermoplastic elastomer; and c) a non-polar olefin-based layer formed from a second composition comprising at least one non-polar olefin-based polymer.

Fabric Layer

The fabric substrate layer may comprise any natural and/or synthetic materials. Synthetic materials include, for example, various synthetics based on polyolefins (e.g., polyethylene, polypropylene, etc.), nylon, polyester, polyurethane (e.g., a spandex material), and blends or combinations thereof. Natural materials include, for example, cotton, silk, or blends thereof. In a particular embodiment, the fabric substrate layer is a nonwoven, spunbound material. In an alternative embodiment, the fabric substrate layer is a woven material. In one embodiment, the fabric substrate layer comprises a material of a weight of from 100 to 500, more typically of from 150 to 400 and even more typically of from 200 to 350, grams per square meter (g/m$^2$). In one embodiment, the fabric substrate layer is prepared from polyester, polyethylene or polypropylene. In a particular embodiment, the fabric can be subjected to a pre-lamination treatment, such as, corona surface treatment or impregnation.

Adhesive Layer

The adhesive layer is formed from a composition which comprises a thermoplastic elastomer and an anhydride and/or carboxylic acid functionalized, chlorinated olefin-based polymer that has a chlorine content from 1 to 20 wt %, based on the total weight of the anhydride and/or carboxylic acid functionalized, chlorinated olefin-based polymer and the thermoplastic elastomer or from 10 to 35 wt % based on the total weight of the anhydride and/or carboxylic acid functionalized, chlorinated olefin-based polymer.

Thermoplastic Elastomer

Any thermoplastic elastomer may be used in forming the first composition. As used herein, the term thermoplastic elastomer means materials with both thermoplastic and elastomeric properties. Typical thermoplastic elastomers include styrene block copolymers, polyolefin (or olefin-based polymer) blends, elastomeric alloys, thermoplastic polyurethanes, thermoplastic copolyesters, thermoplastic polyamides, and functionalized polyolefins. Exemplary functionalized polyolefins include, for example, maleic anhydride functionalized polyolefins.

In a particular embodiment, the thermoplastic elastomer is a styrene ethylene butene styrene (SEBS) block copolymer with a styrene content of equal to or less than 35 wt %, and further a Young's modulus of equal to or less than 10 MPa provided the thermoplastic elastomer has Young's modulus of equal to or less than 10 MPa. All individual values and subranges from equal to or less than 10 MPa are included and disclosed herein; for example, the Young's modulus of the thermoplastic elastomer can be equal to or less than 10 MPa, or in the alternative, equal to or less than 9 MPa, or in the alternative, equal to or less than 8 MPa, or in the alternative, equal to or less than 6 MPa, or in the alternative, equal to or less than 4 MPa. In a particular embodiment, the Young's modulus of the thermoplastic elastomer is no less than 0.5 MPa. All individual values and subranges of a styrene content equal to or less than 35% by weight are included and disclosed herein. For example, the styrene content can be from an upper limit of 35 wt %, or in the alternative, 30 wt %, or in the alternative, 25 wt %.

Examples of styrenic block copolymers suitable for the invention are described in the following issued patents and patent application publications: EP 0 712 892 B1, WO 2004/041538 A1, U.S. Pat. No. 6,582,829B1, US2004/0087235 A1, US2004/0122408 A1, US2004/0122409A1, and U.S. Pat. Nos. 4,789,699, 5,093,422 and 5,332,613, the disclosures of which are incorporated herein by reference.

In general, hydrogenated styrenic block copolymers suitable for the invention have at least two mono-alkenyl arene blocks, preferably two polystyrene blocks, separated by a block of saturated conjugated diene comprising less than 20% residual ethylenic unsaturation, preferably a saturated polybutadiene block. The preferred styrenic block copolymers have a linear structure although in some embodiments, branched or radial polymers or functionalized block copolymers make useful compounds.

Typically, polystyrene-saturated polybutadiene-polystyrene and polystyrene-saturated polyisoprene-polystyrene block copolymers comprise polystyrene end-blocks having a number average molecular weight from 5,000 to 35,000 and saturated polybutadiene or saturated polyisoprene midblocks having a number average molecular weight from 20,000 to 170,000. The saturated polybutadiene blocks preferably have from 35-55% 1,2-configuration and the saturated polyisoprene blocks preferably have greater than 85% 1,4-configuration.

The total number average molecular weight of the styrenic block copolymer is preferably from 30,000 to 250,000 if the copolymer has a linear structure. Such block copolymers typically have an average polystyrene content from 10% by weight to 30%, more typically from 10% by weight to 20% by weight.

SEBS (S is styrene, E is ethylene and B is butylene) and SEPS (P is propylene) block copolymers useful in certain embodiments of the present invention are available from Kraton Polymers, Asahi Kasei and Kuraray America.

In another embodiment, the thermoplastic elastomer is an olefin-based polymer (for example, an ethylene-based polymer or a propylene-based polymer) having a Brookfield viscosity at 177° C. from 8 to 20 Pa-sec. All individual values and subranges from 8 to 20 Pa-sec are included and disclosed herein; for example, the Brookfield viscosity can be from a lower limit of 8, 10, 12, 14, 16, or 19 Pa-sec to an upper limit of 9, 11, 13, 15, 17, or 20 Pa-sec. For example, the Brookfield viscosity can be from 8 to 20 Pa-sec, or in the alternative, from 8 to 14 Pa-sec, or in the alternative, from 14 to 20 Pa-sec, or in the alternative, from 10 to 18 Pa-sec.

Anhydride and/or Carboxylic Acid Functionalized, Chlorinated Olefin Based Polymer As used herein, the term anhydride and/or carboxylic acid functionalized, chlorinated olefin-based polymer refers to a chlorinated olefin-based polymer into, or onto, which maleic anhydride and/or carboxylic acid functional groups are grafted onto the olefin based polymer; or an olefin-based polymer comprising one or more chlorine containing comonomers, and which is later functionalized with maleic anhydride and/or carboxylic acid functional groups. Grafting reactions, are described for example in U.S. Pat. Nos. 8,450,430 and 7,763,692, the disclosures of which are incorporated herein by reference. Alternatively, the functional group may be present in a copolymer (i.e., carboxylic acid functional group) which is copolymerized with the olefin monomers to form the olefin based polymer.

In one embodiment, the anhydride and/or carboxylic acid functionalized, chlorinated olefin-based polymer is formed from a chlorinated olefin-based polymer onto, which maleic anhydride and/or carboxylic acid functional groups is grafted onto, the olefin based polymer.

The first composition is formed using an anhydride and/or carboxylic acid functionalized, chlorinated olefin-based polymer that has a chlorine content from 10 to 35 wt %, based on the total weight of the anhydride and/or carboxylic acid functionalized, chlorinated olefin-based polymer. All individual values and subranges from 10 to 35 wt % chlorine are included and disclosed herein; for example, the chlorine content can be from a lower limit of 10, 14, 18, 22, 26, 30 or 34 wt % to an upper limit of 12, 16, 20, 24, 28, 32, or 35 wt %. For example, the chlorine content can be from 10 to 35 wt %, or in the alternative, from 10 to 20 wt %, or in the alternative, from 20 to 35 wt %, or in the alternative, from 18 to 32 wt %, or in the alternative, from 15 to 30 wt %.

Alternatively, the first composition is formed using an anhydride and/or carboxylic acid functionalized, chlorinated olefin-based polymer that has a chlorine content from 1 to 20 wt %, based on the total weight of the anhydride and/or carboxylic acid functionalized, chlorinated olefin-based polymer and the thermoplastic elastomer. All individual values and subranges from 1 to 20 wt % chlorine are included and disclosed herein; for example, the chlorine content can be from a lower limit of 1, 5, 10, or 15 wt % to an upper limit of 2, 7, 12, 17, or 20 wt %. For example, the chlorine content can be from 1 to 20 wt %, or in the alternative, from 1 to 10 wt %, or in the alternative, from 10 to 20 wt %, or in the alternative, from 1 to 5 wt %.

In a particular embodiment, the anhydride and/or carboxylic acid functionalized, chlorinated olefin-based polymer is a maleic anhydride grafted chlorinated olefin-based polymer. In yet another specific embodiment, the anhydride and/or carboxylic acid functionalized, chlorinated olefin-based polymer is a maleic anhydride grafted chlorinated olefin-based polymer having a maleic anhydride content of from 0.75 to 3 wt %, based on the weight of the anhydride functionalized, chlorinated olefin-based polymer. All individual values and subranges from 0.75 to 3 wt % are included and disclosed herein; for example, the maleic anhydride level can be from a lower limit of 0.75, 1, 1.5, 2, 2.5 or 2.75 wt % to an upper limit of 0.9, 1.35, 1.8, 2.25, 2.8 or 3 wt %. For example, the maleic anhydride level can be from 0.75 to 3.00 wt %, or in the alternative, from 0.75 to 1.75 wt %, or in the alternative, from 1.75 to 3 wt %, or in the alternative, from 1.00 to 2.00 wt %. In another embodiment, the anhydride and/or carboxylic acid functionalized, chlorinated olefin-based polymer is a maleic anhydride grafted chlorinated olefin-based polymer having a weight average molecular weight, Mw, from 25,000 to 125,000 g/mole. All individual values and subranges from 25,000 tto 125,000 are included and disclosed herein; for example, the Mw can be from a lower limit of 25000, 50000, 75000, or 100000 g/mole to an upper limit of 50000, 75000, 100000, or 125000. For example, the Mw can be from 25000 to 125000, or in the alternative, from 25000 to 75000, or in the alternative, from 75000 to 125000, or in the alternative, from 50000 to 100000.

Examples of chlorinated ethylene polymers include those prepared from copolymers comprising ethylene and at least one ethylenically unsaturated monomer, selected from the group consisting of $C_3$-$C_{10}$ alpha mono-olefins.

Chlorinated graft copolymers are included as well. Specific examples of suitable chlorinated ethylene copolymers, which may be employed in the compositions of this invention, include copolymers of ethylene with propylene, 1-butene, 3-methyl-1-pentene, 1-pentene, 1-hexene, 1-heptene or octene. The copolymers may be dipolymers, terpolymers, or higher order copolymers. In a particular embodiment, chlorinated polyethylene is the chlorinated olefin-based polymer.

Solvent

In a particular embodiment, the adhesive layer is formed from a first composition which comprises a solvent solution of a thermoplastic elastomer and an anhydride and/or carboxylic acid functionalized, chlorinated olefin-based polymer with the requisite chlorine content, wherein the solvent is a non-aromatic and nonchlorinated solvent. Any non-aromatic and non-chlorinated solvent may be used in forming the solvent solution of the adhesive layer. Exemplary non-aromatic and non-chlorinated solvents include methyl cyclohexane, ethyl cyclohexane, methyl ethyl ketone, ethyl acetate, butyl acetate, and any combination of two or more thereof.

Non-Polar Olefin-Based Layer

The non-polar olefin-based layer is formed from a composition comprising at least one non-polar olefin-based polymer. Each at least one non-polar olefin-based polymer comprises equal to or greater than 50 wt % units derived from olefinic monomers and no polar component.

In one embodiment, the non-polar olefin-based polymer comprises a propylene/alpha-olefin copolymer, preferably a propylene/ethylene copolymer, and at least one of (i) a styrenic block copolymer, (ii) a homogeneously branched ethylene/alpha-olefin copolymer, (iii) an olefin block copolymer, and (iv) a random polypropylene copolymer. In certain embodiments the non-polar olefin-based layer comprises a propylene/alpha-olefin copolymer and at least two, three or all four of components (i)-(iv). The at least one non-polar olefin-based polymer can comprise a single propylene/alpha-olefin copolymer or a blend of two or more propylene/alpha-olefin copolymers. Likewise, each of the (i) a styrenic block copolymer, (ii) a homogeneously branched ethylene/alpha-olefin copolymer, (iii) an olefin block copolymer, and (iv) a random polypropylene copolymer can be present neat or as a blend of two or more copolymers. The at least one non-polar olefin-based polymer can also comprise one or more optional additives such as processing aids, extenders, blocking agents, pigments and/or dyes, antioxidants, UV-stabilizers and/or absorbers, flame retardants, fillers (such as talc, calcium carbonate), and the like.

The at least one non-polar olefin-based polymer typically comprises at least 30, more typically at least 40 and even more typically at least 50, weight percent (wt %) propylene/alpha-olefin copolymer. The maximum amount of propylene/alpha-olefin copolymer in the at least one polar olefin-based polymer typically does not exceed 90, more typically does not exceed 80 and even more typically does not exceed 70, wt %. The non-polar olefin-based layer can be compositionally the same as the top skin layer save for the gas and by-products attributable to the foaming process.

The total amount of (i) styrenic block copolymer, (ii) homogeneously branched, linear ethylene/alpha-olefin copolymer, (iii) olefin block copolymer, and (iv) random polypropylene copolymer in the at least one polar olefin-based polymer typically is at least 10, more typically at least 20 and even more typically at least 30 wt %. The maximum total amount of (i) styrenic block copolymer, (ii) homogeneously branched ethylene/alpha-olefin copolymer, (iii) olefin block copolymer, and (iv) random polypropylene copolymer in the non-polar olefin-based layer typically does not exceed 70, more typically does not exceed 60 and even more typically does not exceed 50, wt %.

The propylene/alpha-olefin copolymer, in certain embodiments, is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

The propylene/alpha-olefin copolymer may have a melt flow rate (MFR) in the range of from 0.1 to 25 g/10 minutes, measured in accordance with ASTM D-1238 (at 230° C./2.16 Kg). All individual values and subranges from 0.1 to 25 g/10 minutes are included and disclosed by this range; for example, the MFR can be from a lower limit of 0.1 g/10 minutes, 0.2 g/10 minutes, or 0.5 g/10 minutes to an upper limit of 25 g/10 minutes, 15 g/10 minutes, 10 g/10 minutes, 8 g/10 minutes, or 5 g/10 minutes. For example, the propylene/alpha-olefin copolymer may have a MFR in the range of 0.1 to 10 g/10 minutes; or the propylene/alpha-olefin copolymer may have a MFR in the range of 0.2 to 10 g/10 minutes. In a further embodiment, the propylene/alpha-olefin is a propylene/ethylene copolymer.

In specific embodiments, the propylene/alpha-olefin copolymer has a density from 0.85 to 0.89 g/cc. All individual values and subranges from 0.85 to 0.89 g/cc are included and disclosed herein; for example, the density can be from a lower limit of 0.85, 0.86, 0.87 or 0.88 g/cc to an upper limit of 0.855, 0.865, 0.875, 0.885 or 0.89 g/cc. For example, the density can be from 0.85 to 0.89 g/cc, or in the alternative, from 0.85 to 0.87 g/cc, or in the alternative, from 0.87 to 0.89 g/cc, or in the alternative, from 0.86 to 0.888 g/cc. In a further embodiment, the propylene/alpha-olefin is a propylene/ethylene copolymer.

The propylene/alpha-olefin copolymer comprises units derived from propylene and one or more alpha-olefin comonomers. Exemplary comonomers utilized to manufacture the propylene/alpha-olefin copolymer are $C_2$ and $C_4$ to $C_{10}$ alpha-olefins; for example, $C_2$, $C_4$, $C_6$ and $C_8$ alpha-olefins. The propylene/alpha-olefin copolymer comprises from 1 to 30 wt % of one or more units derived from one or more alpha-olefin comonomers.

The propylene/alpha-olefin copolymer has a molecular weight distribution (MWD), defined as weight average molecular weight divided by number average molecular weight ($M_w/M_n$) of 3.5 or less; or 3.0 or less; or from 1.8 to 3.0. In a further embodiment, the propylene/alpha-olefin is a propylene/ethylene copolymer.

Such propylene/alpha-olefin copolymers are further described in the U.S. Pat. Nos. 6,960,635 and 6,525,157. Such propylene/alpha-olefin copolymers are commercially available from The Dow Chemical Company, under the trade name VERSIFY, or from ExxonMobil Chemical Company, under the trade name VISTAMAXX.

Specific Embodiments

In a particular embodiment, the invention provides the coated substrate according to any embodiment disclosed herein except that the first composition further comprises a solvent and the first composition comprises from 1 to 99 weight percent solvent, from 0.1 to 20 weight percent of the thermoplastic elastomer and from 0.1 to 20 weight percent of the anhydride and/or carboxylic acid functionalized, chlorinated olefin-based polymer. All individual values and subranges of from 1 to 99 wt % solvent are included and disclosed herein; for example the first composition can comprise solvent from a lower limit of 1, 20, 40, 60 or 80 wt % to an upper limit of 10, 30, 50, 70, 90 or 99 wt %. The amount of solvent in the first composition can be from 1 to 99 wt %, or in the alternative, from 1 to 70 wt %, or in the alternative, from 60 to 99 wt %, or in the alternative, from 70 to 95 wt %. In various embodiments, each of the thermoplastic elastomer and anhydride and/or carboxylic acid functionalized, chlorinated olefin-based polymer can be present in the first composition from 0.1 to 20 wt %. All individual values from 0.1 to 20 wt % are included and disclosed herein; for example, the amount of thermoplastic elastomer and anhydride and/or carboxylic acid functionalized, chlorinated olefin-based polymer in the solvent solution can be from a lower limit of 0.1, 4, 8, 12, 16 or 19 wt % to an upper limit of 1, 5, 9, 13, 17 or 20 wt %. For example, the amount of thermoplastic elastomer and anhydride and/or carboxylic acid functionalized, chlorinated olefin-based polymer in the first composition can be from 0.1 to 20 wt %, or in the alternative, from 8 to 20 wt %, or in the alternative, from 0.1 to 12 wt %, or in the alternative, from 8 to 16 wt %.

In another embodiment, the invention provides the coated substrate according to any embodiment disclosed herein, except that the first composition further comprises a non-aromatic nonchlorinated solvent and the first composition has a Brookfield viscosity (solution) of from 10 to 400 cP, measured at room temperature (about 26 degrees C.). All individual values and subranges from 10 to 400 cP are included and disclosed herein. For example, the Brookfield (solution) viscosity can range from a lower limit of 10, 20, 30, 40 or 50 cP to an upper limit of 100, 150, 200, 250, 300, 350 or 400 cP. For example, the Brookfield (solution) viscosity can be from 20 to 350 cP, or in the alternative, from 30 to 300 cP, or in the alternative, from 40 to 250 cP, or in the alternative, from 50 to 200 cP.

In a particular embodiment, the invention provides the coated substrate according to any embodiment disclosed herein except that the fabric substrate layer comprises polyethylene terephthalate.

In a particular embodiment, the invention provides the coated substrate according to any embodiment disclosed herein except that the thermoplastic elastomer is selected from the group consisting of i) styrene ethylene butene styrene (SEBS) block copolymers with a styrene content of equal to or less than 30% and a Young's modulus of equal to or less than 10 MPa; and ii) functionalized polyolefin (or olefin-based polymer) elastomer having a Brookfield viscosity at 177° C. from 8 to 20 Pa-sec.

In a particular embodiment, the invention provides the coated substrate according to any embodiment disclosed herein except that the thermoplastic elastomer is a maleic anhydride functionalized polyolefin.

In a particular embodiment, the invention provides the coated substrate according to any embodiment disclosed herein except that the anhydride and/or carboxylic acid functionalized, chlorinated olefin-based polymer has a chlorine content of equal to or greater than 16 wt %.

In a particular embodiment, the invention provides the coated substrate according to any embodiment disclosed herein except that the anhydride and/or carboxylic acid functionalized, chlorinated olefin-based polymer is a maleic anhydride functionalized chlorinated olefin based polymer having an amount of maleic anhydride functional group of from 1 to 3 wt % and a chlorine content from 16 to 30 wt %.

In a particular embodiment, the invention provides the coated substrate according to any embodiment disclosed herein except that the solvent of the adhesive layer is selected from the group consisting of methyl cyclohexane, ethyl cyclohexane, methyl ethyl ketone, ethyl acetate, butyl acetate, and combinations thereof.

In a particular embodiment, the invention provides the coated substrate according to any embodiment disclosed herein except that the solvent solution of the adhesive layer contains no ethylene vinyl acetate.

In a particular embodiment, the invention provides the coated substrate according to any embodiment disclosed herein except that the first composition comprises equal to or greater than 95 weight percent total of thermoplastic elastomer and an anhydride and/or carboxylic acid functionalized, chlorinated olefin-based polymer.

In a particular embodiment, the invention provides the coated substrate according to any embodiment disclosed herein except that the at least one polar olefin-based polymer is a propylene/alpha-olefin copolymer blended with at least one of (i) a styrenic block copolymer, (ii) a homogeneously branched ethylene/alpha-olefin copolymer, (iii) an olefin block copolymer, and (iv) a random polypropylene copolymer.

In a particular embodiment, the invention provides the coated substrate according to any embodiment disclosed herein except that the non-polar olefin-based layer comprises a non-polar olefin-based polymer which exhibits one or both of the following properties: a density from 0.85 to 0.92 g/cc and a melt flow rate from 0.1 to 80 g/10 min. All individual values and subranges from 0.85 to 0.92 g/cc are included and disclosed herein; for example, the density can be from a lower limit of 0.85, 0.87, 0.89, or 0.91 g/cc to an upper limit of 0.86, 0.88, 0.90 or 0.92 g/cc. For example, the density can be from 0.85 to 0.92 g/cc, or in the alternative, from 0.85 to 0.89 g/cc, or in the alternative, from 0.89 to 0.92 g/cc, or in the alternative, from 0.86 to 0.91 g/cc. All individual values and subranges of a melt flow rate from 0.1 to 80 g/10 min are included and disclosed herein; for example, the melt flow rate can be from a lower limit of 0.1, 10, 30, 50 or 70 to an upper limit of 5, 25, 35, 55, 75 or 80 g/10 min. For example, the melt flow rate can be from 0.1 to 80 g/10 min, or in the alternative, from 0.1 to 50 g/10 min, or in the alternative, from 30 to 80 g/10 min, or in the alternative, from 20 to 60 g/10 min.

In yet another embodiment, the invention provides an article comprising at least one component formed from the coated substrate according to any embodiment disclosed herein. Exemplary articles include water resistant consumer products such as back packs, briefcases, totes, and tents, and artificial leather.

In an alternative embodiment, the fabric substrate layer is a nonwoven, polymeric, spunbound material.

In an alternative embodiment, the first composition has a Brookfield (solution) viscosity at room temperature (about 26 degrees C.) of from 10 to 400 cP.

In yet another embodiment, the fabric substrate layer comprises polyamide.

In an alternative embodiment, the anhydride and/or carboxylic acid functionalized, chlorinated olefin-based polymer has a chlorine content of from 16 to 30 wt %, based on the weight of the functionalized, chlorinated olefin-based polymer.

In another embodiment, the non-polar olefin-based layer comprises a non-polar olefin-based polymer which exhibits one or both of the following properties: a density from 0.85 to 0.92 g/cc and a melt flow rate from 0.1 to 80 g/10 min.

In another embodiment, the adhesive composition comprises from 1 to 99 weight percent solvent, from 0.1 to 20 weight percent of the thermoplastic elastomer and from 0.1 to 20 weight percent of the anhydride and/or carboxylic acid functionalized, chlorinated olefin-based polymer.

The disclosure further provides an adhesive composition wherein the thermoplastic elastomer is selected from the group consisting of i) styrene ethylene butene styrene (SEBS) block copolymers with a styrene content of equal to or less than 35%; and ii) an olefin-based polymer.

In another embodiment, the thermoplastic elastomer is a maleic anhydride functionalized olefin-based polymer.

In another embodiment, the first composition of the adhesive layer contains no ethylene vinyl acetate.

The disclosure further provides an adhesive formed from the composition according to any embodiment disclosed herein.

Examples

The following examples are illustrative of specific embodiments of the invention but are not intended to limit the appended claims.

Materials Used in Preparing the Examples

Fabric substrate layer: The fabric used in this study is black woven polyester fabric, which is commercially available from Yaw Liamy Enterprise Co., Ltd. (Materials International City Pin HU, Shen Zhen, China).

Non-polar olefin-based layer: The layer was formed from a composition comprising a propylene/ethylene copolymer, and the composition has a density of 0.87 g/cc and a melt flow rate of 3.35 g/10 min. See, for example, WO2011/008336, the disclosure of which is incorporated herein by reference.

F-2P is a maleic anhydride grafted, chlorinated olefin-based polymer having a Mw of 75,000 g/mole, a maleic anhydride level of 1.6 wt % and a chlorine content of 20 wt %, which is commercially available from Toyobo Co., Ltd. (Kita-ku, Osaka, Japan).

KRATON G1652, thermoplastic elastomer, is linear tri-block copolymer based on styrene and ethylene/butylene, S-E/B-S, with bound styrene of 30% mass and a melt index, $I_5$, of 5 g/10 min, which is commercially available from Kraton Polymers U.S, L.L.C. (Houston, Tex., USA).

AFFINITY GA 1000R, thermoplastic elastomer, is a maleic anhydride grafted AFFINITY GA, having a maleic anhydride level of 1.1 wt % and a melt viscosity of 13,000 cP, which is commercially available from The Dow Chemical Company (Midland, Mich., USA). AFFINITY GA 1000R melt viscosity is measured according to ASTM D3236.

Adhesive Layer Composition Preparation:

Adhesive layer composition used in the Inventive Examples were prepared by dissolving F-2P maleic anhydride functionalized chlorinated olefin-based polymer and thermoplastic elastomer pellets (KRATON G1652 or AFFINITY GA 1000R) in an organic solvent with stirring. Adhesive layer compositions used in the Comparative Examples were also dissolved in the same solvent. The exact components and ratios are listed below. The obtained adhesive solution was cooled to room temperature for at least 24 hours to make sure it is stable for room temperature storage.

Inventive Example 1 (IE-1): F-2P/KRATON G1652 (20/80) blend was dissolved into methyl cyclohexane with the solid (i.e., polymer) concentration of 10 wt %.

For Inventive Example 2 (IE-2): F-2P/AFFINITY GA1000R (20/80) blend was dissolved into methyl cyclohexane with the solid concentration of 5 wt %.

For Comparative Example 1(CE-1): KRATON G1652 was dissolved into methyl cyclohexane with the solid concentration of 10 wt %.

For Comparative Example 2 (CE-2): F-2P was dissolved into methyl cyclohexane with solid concentration of 10 wt %.

For Comparative Example 3 (CE-3): AFFINITY GA1000R was dissolved into methyl cyclohexane with solid concentration of 10 wt %.

Lamination

The fabric was coated with the prepared adhesive layer composition (first composition), and then the coated fabric was placed in an oven for 2 minutes at 120° C. to remove the organic solvent. The coated fabric was laminated with non-polar layer using a compression molder at 115° C. for 12 seconds with a compression force of 4 kN.

For Comparative Example 4, the non-polar layer was laminated directly onto the fabric without the adhesive layer.

In the field of coated fabrics, coating weight is generally used in lieu of coating thickness. For this case, the coating weight for both the inventive example and comparative examples are 10~20 gsm (gram per square meter).

Testing

Figure 1:
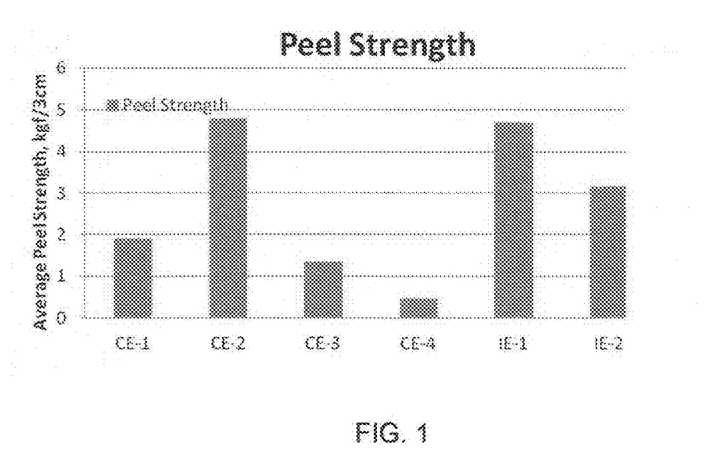
FIG. 1 illustrates the peel strength of the inventive and comparative examples.

The laminated products were each cut into "3 cm×15 cm×0.5 mm" rectangular specimens, and the peel strength was measured on the INSTRON using 180 degree peel test with a crosshead speed of 300 mm/min. The average load (kgf) was recorded and the average peel strength (kgf/3 cm; 5 test samples tested per example) was reported. FIG. 1 illustrates the peel strengths for each of the Inventive and Comparative Examples.

The corresponding peel strength of laminated samples prepared by using different adhesives is listed in FIG. 1. As can be seen in FIG. 1, the Inventive Examples exhibit enhanced peel strengths.

Figure 2:
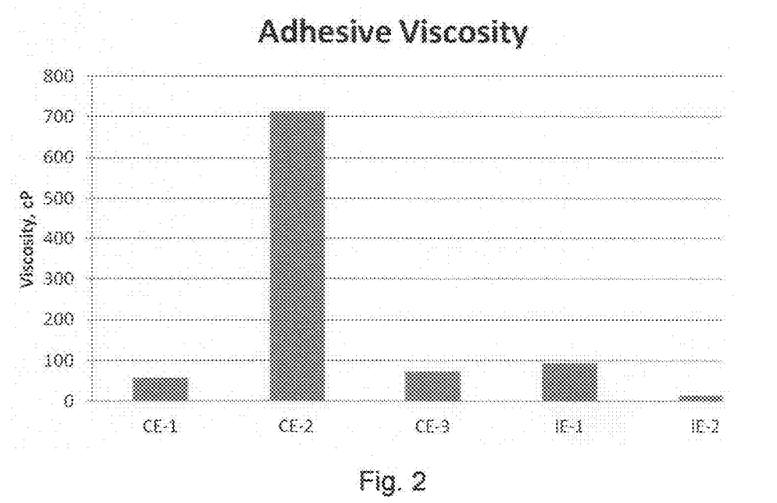
FIG. 2 illustrates the Brookfield viscosity of the first composition which comprises a thermoplastic elastomer and an anhydride and/or carboxylic acid functionalized, chlorinated olefin-based polymer that has a chlorine content from 10 to 35 wt %, based on the total weight of the anhydride and/or carboxylic acid functionalized, chlorinated olefin-based polymer, and a non-aromatic and nonchlorinated solvent of the adhesive layer of selected inventive and comparative examples.

FIG. 2 illustrates the Brookfield viscosity (solution viscosity) of the adhesive layer compositions of the inventive and comparative examples.

Figure 3:
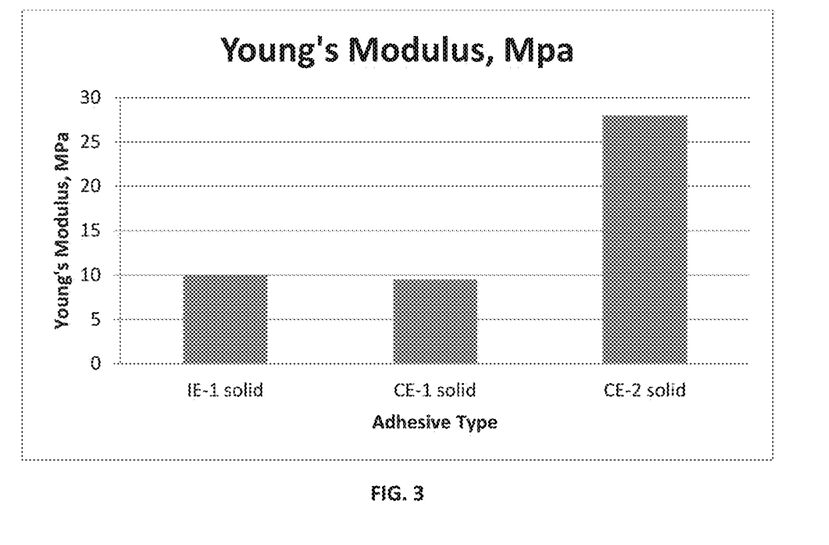
FIG. 3 illustrates the Young's Modulus of Inventive Example 1 and Comparative Examples 1 and 2.

Besides peel strength, the haptics of the coated fabric is also important. Usually a soft flexible coated fabric is preferred for the sake of good hand feel. The hand feel or haptics is very subjective but is heavily dependent on the modulus of the adhesive coated on the fabric. FIG. 3 provides the Young's modulus of the adhesive solids (prepared by removing the organic solvents). As seen in FIG. 1, CE-2 has comparable peel strength with IE-1. However, as seen in FIG. 3, CE-2 has much higher modulus than IE-1, which indicates the corresponding coated fabric with CE-2 will be very rigid and thus a poor hand feeling. Therefore the combining of chlorinated olefin-based polymer with soft thermoplastic elastomer in this invention could achieve a well balanced peel strength and coated fabric hand feel.

Test Methods

Unless otherwise indicated for a specific material, test methods include the following:

Chlorine content is measured according to ASTM D3566-03;

Melt Flow Rate (MFR) is measured according to ASTMD-1238 (230° C., 2.16 kg).

Melt index, $I_2$, is measured according to ASTM D-1238, Condition 190° C./2.16 kg.

Melt index, $I_5$, is measured according to ASTM D-1238, Condition 190° C./5.0 kg.

Density is measured in accordance with ASTM D-792.

Brookfield viscosity (solution viscosity) is measured by ASTM D 3236 at room temperature.

Brookfield viscosity (melt viscosity) is measured by ASTM D 3236 at 177° C. When used in connection with a neat polymer, the Brookfield viscosity refers to the melt viscosity.

Conventional GPC measurements were used to determine the weight-average (Mw) and number-average (Mn) molecular weight of the polymer, and to determine the MWD (=Mw/Mn). Samples were analyzed with a high-temperature GPC instrument (Polymer Laboratories, Inc. model PL220).

The method employs the well-known universal calibration method, based on the concept of hydrodynamic volume, and the calibration was performed using narrow polystyrene (PS) standards along with four mixed A, 20 μm columns (PLgel Mixed A from Agilent (formerly Polymer Laboratory Inc.)), operating at a system temperature of 140° C. Samples were prepared at a "2 mg/mL" concentration, in 1,2,4-trichlorobenzene solvent. The flow rate was 1.0 mL/min, and the injection size was 100 microliters.

The molecular weight determination was deduced by using narrow molecular weight distribution polystyrene standards (from Polymer Laboratories), in conjunction with their elution volumes. The equivalent polyethylene molecular weights were determined by using appropriate Mark-Houwink coefficients for polyethylene and polystyrene (as described by Williams and Ward in *Journal of Polymer Science, Polymer Letters*, Vol. 6, (621) 1968) to derive the following equation:

Mpolyethylene=$a$*(Mpolystyrene)$^b$.

In this equation, a=0.4316 and b=1.0. Weight average molecular weight (Mw) and number average molecular weight (Mn) were calculated in the usual manners. For example, Mw was calculated according to the following formula: Mw=$\Sigma$wi Mi, where wi and Mi are the weight fraction and molecular weight, respectively, of the ith fraction eluting from the GPC column. Polyethylene equivalent molecular weight calculations were performed using Viscotek TriSEC software Version 3.0.

The Young's modulus of the adhesive films were measured using the dynamic mechanical thermal analysis (DMTA) test on tensile mode DMA RSAIII (TA instruments) with a strain of 0.5% and frequency of 6.28 rad/s. The temperature ramping was set from 25 C to 80 C at 2 C/min. The sample size about 12 mm (Length) by 8 mm (Width) by 1 mm (Thickness).

The present invention may be embodied in other forms without departing from the spirit and the essential attributes thereof, and, accordingly, reference should be made to the appended claims, rather than to the foregoing specification, as indicating the scope of the invention.

We claim:
1. A coated substrate comprising:
a) a fabric substrate layer;
b) a coating layer on the fabric substrate layer, the coating layer comprising a first composition comprising (i) a thermoplastic elastomer that is a styrene-ethylene/butene-styrene block copolymer comprising from 10 wt % to 30 wt % styrene, (ii) an anhydride and/or carboxylic acid functionalized, chlorinated olefin-based polymer that has a chlorine content from 10 to 35 wt %, based on the total weight of the anhydride and/or carboxylic acid functionalized, chlorinated olefin-based polymer and the thermoplastic elastomer, and (iii) an organic solvent that is non-aromatic and non-chlorinated, the first composition having a Brookfield viscosity (solution) at 26° C. from 10 cP to 400 cP.

2. A coated substrate comprising:
a) a fabric substrate layer;
b) a coating layer on the fabric substrate layer, the coating layer comprising a first composition comprising (i) a thermoplastic elastomer that is a maleic anhydride functionalized ethylene-based polymer, (ii) an anhydride and/or carboxylic acid functionalized, chlorinated olefin-based polymer that has a chlorine content from 10 to 35 wt %, based on the total weight of the anhydride and/or carboxylic acid functionalized, chlorinated olefin-based polymer, and (iii) an organic solvent that is non-aromatic and nonchlorinated, the first composition having a Brookfield viscosity (solution) at 26° C. from 10 cP to 400 cP.

3. The coated substrate of claim 1, wherein the fabric substrate layer is a woven polymeric material comprising polyethylene terephthalate.

4. The coated substrate according to claim 2, wherein the fabric substrate layer is a woven polymeric material comprising polyethylene terephthalate.

5. The coated substrate according to claim 3, wherein the anhydride and/or carboxylic acid functionalized, chlorinated olefin-based polymer is a maleic anhydride functionalized chlorinated olefin based polymer having an amount of maleic anhydride functional groups of from 0.75 to 3 wt %, based on the weight of the functionalized chlorinated polymer, and a weight average molecular weight, Mw, from 25,000 g/mol to 125,000 g/mol.

6. The coated substrate according to claim 3, wherein the solvent of the first composition is selected from the group consisting of the following: methyl cyclohexane, ethyl cyclohexane, methyl ethyl ketone, ethyl acetate, butyl acetate, and combinations thereof.

7. An adhesive composition comprising
(i) from 4 wt % to 9 wt % of a thermoplastic elastomer selected from the group consisting of styrene-ethylene/butene-styrene block copolymer comprising from 10 wt % to 30 wt % styrene, and maleic anhydride functionalized ethylene-based polymer;
(ii) from 0.1 wt % to 1 wt % of a maleic anhydride functionalized chlorinated olefin-based polymer that has a chlorine content from 10 to 35 wt %, based on the total weight of the anhydride and/or carboxylic acid functionalized, chlorinated olefin-based polymer;
(iii) from 90 wt % to 95 wt % of an organic solvent that is non-aromatic and nonchlorinated; and
the adhesive composition has a Brookfield viscosity (solution) at 26° C. from 10 cP to 400 cP.

8. The coated substrate of claim 1, wherein the anhydride and/or carboxylic acid functionalized, chlorinated olefin-based polymer is a maleic anhydride functionalized chlorinated olefin based polymer having a maleic anhydride functional group content from 1 wt % to 3 wt % and a chlorine content from 16 wt % to 30 wt %, based on the weight of the functionalized chlorinated polymer, and a weight average molecular weight, Mw, from 25,000 g/mol to 125,000 g/mol.

9. The coated substrate of claim 2, wherein the anhydride and/or carboxylic acid functionalized, chlorinated olefin-based polymer is a maleic anhydride functionalized chlorinated olefin based polymer having a maleic anhydride functional group content from 1 wt % to 3 wt % and a chlorine content from 16 wt % to 30 wt %, based on the weight of the functionalized chlorinated polymer, and a weight average molecular weight, Mw, from 25,000 g/mol to 125,000 g/mol.

10. The adhesive composition of claim 7, wherein the maleic anhydride functionalized chlorinated olefin based polymer has a maleic anhydride functional group content from 1 wt % to 3 wt % and a chlorine content from 16 wt % to 30 wt %, based on the weight of the functionalized chlorinated polymer, and a weight average molecular weight, Mw, from 25,000 g/mol to 125,000 g/mol.

11. The adhesive composition of claim 7, wherein the solvent is methyl cyclohexane.

12. The coated substrate of claim 1 further comprising
(c) a non-polar olefin-based layer adhered to the adhesive layer, the non-polar olefin-based layer comprising a non-polar olefin-based polymer having (i) a density from 0.85 g/cc to 0.89 g/cc and (ii) a melt flow rate from 0.1 g/10 min to 10 g/10 min.

13. The coated substrate of claim 12, wherein the non-polar olefin-based polymer is a propylene/ethylene copolymer.

14. The coated substrate of claim 2 further comprising
(c) a non-polar olefin-based layer adhered to the adhesive layer, the non-polar olefin-based layer comprising a non-polar olefin-based polymer having (i) a density from 0.85 g/cc to 0.89 g/cc and (ii) a melt flow rate from 0.1 g/10 min to 10 g/10 min.

15. The coated substrate of claim 14, wherein the non-polar olefin-based polymer is a propylene/ethylene copolymer.

16. The coated substrate of claim 1 wherein the coated layer consists of (i) the thermoplastic elastomer, (ii) the anhydride and/or carboxylic acid functionalized chlorinated olefin-based polymer, and the organic solvent.

17. The coated substrate of claim 2 wherein the coated layer consists of (i) the thermoplastic elastomer, (ii) the anhydride and/or carboxylic acid functionalized chlorinated olefin-based polymer, and the organic solvent.

18. The adhesive composition of claim 7 consisting of (i) the thermoplastic elastomer, (ii) the maleic anhydride functionalized chlorinated olefin-based polymer, and (iii) the organic solvent.

19. The adhesive composition of claim 7 consisting of
 (i) from 4 wt % to 9 wt % of the styrene-ethylene/butene-styrene block copolymer comprising from 10 wt % to 30 wt % styrene;
 (ii) from 0.1 wt % to 1 wt % of the maleic anhydride functionalized chlorinated olefin-based polymer; and
 (iii) from 90 wt % to 95 wt % of the organic solvent that is non-aromatic and nonchlorinated.

20. The adhesive composition of claim 7 consisting of
 (i) from 4 wt % to 9 wt % of the maleic anhydride functionalized ethylene-based polymer;
 (ii) from 0.1 wt % to 1 wt % of the maleic anhydride functionalized chlorinated olefin-based polymer; and
 (iii) from 90 wt % to 95 wt % of the organic solvent that is non-aromatic and nonchlorinated.

\* \* \* \* \*